US012680606B2

(12) United States Patent　　　　(10) Patent No.:　US 12,680,606 B2

Seubert et al.　　　　　　　　　　　(45) Date of Patent:　　Jul. 14, 2026

(54) PLANET CARRIER ASSEMBLY, SHAFT-HUB CONNECTION, AND METHOD FOR PRODUCING THE SHAFT-HUB CONNECTION BETWEEN A CARRIER FLANGE AND A CARRIER FROM THE PLANET CARRIER ASSEMBLY

(71) Applicant: Schaeffler Technologies AG & Co. KG, Herzogenaurach (DE)

(72) Inventors: Manuel Seubert, Eckental (DE); Ralph Schimpf, Nuremberg (DE); Marián Cintula, Myjava (SK); Michal Žacek, Gbely (SK); Martin Capicík, Smolenice (SK)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/278,028

(22) PCT Filed: Jan. 21, 2022

(86) PCT No.: PCT/DE2022/100059
§ 371 (c)(1),
(2) Date: Aug. 21, 2023

(87) PCT Pub. No.: WO2022/179654

PCT Pub. Date: Sep. 1, 2022

(65) Prior Publication Data

US 2024/0125382 A1　　Apr. 18, 2024

(30) Foreign Application Priority Data

Feb. 24, 2021　(DE) ..................... 10 2021 104 342.5

(51) Int. Cl.
F16H 57/08　　　(2006.01)
F16D 1/10　　　(2006.01)
(Continued)

(52) U.S. Cl.
CPC ....... *F16H 57/082* (2013.01); *F16H 57/0025* (2013.01); *F16D 1/10* (2013.01); *F16H 2001/2881* (2013.01)

(58) Field of Classification Search
CPC ............. F16H 57/0082; F16H 57/0025; F16H 1/00–12; F16H 2001/103; F16C 2226/00–222/80
See application file for complete search history.

(56) References Cited

U.S. PATENT DOCUMENTS 5,503,494　A　*　4/1996　Kamata ................. F16D 1/0858
　　　　　　　　　　　　　　　　　　　　403/359.6
6,702,711　B2　　3/2004　Zelikov et al.
(Continued)

FOREIGN PATENT DOCUMENTS

DE　　　　69424245　T5　　1/2001
DE　　102006018496　A1　10/2007
(Continued)

OTHER PUBLICATIONS

Source: Office Action Corresponding to Chinese Patent Application No. 202280016607.1, dated Apr. 25, 2026.

*Primary Examiner* — Ernesto A Suarez
*Assistant Examiner* — Lillian T Nguyen

(57) ABSTRACT

A planet carrier assembly includes a rotational axis, a carrier and a carrier flange. The carrier has circumferentially spaced first driver elements formed thereon and the carrier flange has circumferentially spaced second driver elements formed thereon. The second driver elements are interconnected with the first driver elements at common contact areas in an interlocking manner. The carrier flange is axially secured to the carrier in an axial direction by plastically deformed material at the common contact areas. In an example (Continued)

embodiment, the plastically deformed material is displaced from the first driver elements or the second driver elements.

10 Claims, 12 Drawing Sheets

(51) Int. Cl.
    *F16H 57/00*            (2012.01)
    *F16H 1/28*            (2006.01)

(56)                References Cited

U.S. PATENT DOCUMENTS

| | | | | |
|---|---|---|---|---|
| 6,929,578 | B1 | 8/2005 | Rowell | |
| 2004/0035000 | A1* | 2/2004 | Nakajima | F16D 1/101 |
| | | | | 29/894.3 |
| 2006/0075838 | A1* | 4/2006 | Hacker | F16D 1/072 |
| | | | | 29/447 |
| 2015/0060228 | A1* | 3/2015 | Francis | F16D 25/123 |
| | | | | 192/113.5 |
| 2015/0111692 | A1* | 4/2015 | Saftoiu | B25B 23/0078 |
| | | | | 475/342 |
| 2016/0169372 | A1 | 6/2016 | Kurth | |
| 2020/0224755 | A1 | 7/2020 | Souers et al. | |
| 2022/0145984 | A1* | 5/2022 | Jenkins | F16D 1/112 |
| 2022/0161376 | A1* | 5/2022 | Steinmetz | C23C 24/10 |

FOREIGN PATENT DOCUMENTS

| | | | | |
|---|---|---|---|---|
| DE | 102007003676 | A1 | 7/2008 | |
| DE | 102010032252 | A1 | 1/2012 | |
| DE | 102011011438 | A1 | 8/2012 | |
| DE | 102012223226 | A1 | 6/2014 | |
| DE | 102016216783 | A1 | 3/2018 | |
| DE | 112012000461 | B4 | 6/2018 | |
| DE | 102019125324 | A1 | 9/2020 | |
| DE | 102019113882 | A1 | 11/2020 | |
| DE | 102019206520 | A1 | 11/2020 | |
| DE | 102020114322 | A1 | 12/2021 | |
| DE | 102021111620 | A1 | 11/2022 | |
| DE | 102021126918 | A1 * | 4/2023 | F16H 57/082 |
| EP | 0647789 | A1 * | 4/1995 | F16H 48/40 |
| GB | 2555600 | A | 5/2018 | |
| JP | H07145856 | A | 6/1995 | |
| JP | H11108070 | A * | 4/1999 | |
| WO | WO-2008089866 | A1 * | 7/2008 | F16D 1/0858 |
| WO | WO-2021078433 | A1 * | 4/2011 | F03D 15/00 |

* cited by examiner

PLANET CARRIER ASSEMBLY, SHAFT-HUB CONNECTION, AND METHOD FOR PRODUCING THE SHAFT-HUB CONNECTION BETWEEN A CARRIER FLANGE AND A CARRIER FROM THE PLANET CARRIER ASSEMBLY

CROSS-REFERENCE TO RELATED APPLICATIONS

This application is the United States National Phase of PCT Appln. No. PCT/DE2022/100059 filed Jan. 21, 2022, which claims priority to German Application No. DE102021104342.5 filed Feb. 24, 2021, the entire disclosures of which are incorporated by reference herein.

TECHNICAL FIELD

The present disclosure relates to a planet carrier assembly having at least a carrier flange and a carrier. The carrier flange is arranged to be concentric to a rotational axis of the planet carrier assembly and the first driver elements of the carrier formed on the carrier and second driver elements of the carrier flange formed on the carrier flange are connected in a form-fit manner to one another in circumferential directions around the rotational axis. The carrier flange and the carrier are axially secured to one another by means of at least one axial fixing means in the same direction as the rotational axis by means of at least one axial fixing means. The present disclosure also relates to a shaft-hub connection between the carrier and the carrier flange and a method for producing the shaft-hub connection.

BACKGROUND

A planet gear system of a planet carrier assembly is disclosed in DE 11 2012 000 461 B4. The planet gear system is formed by planet gears, planet pins, and the planet carrier assembly. The planet carrier assembly is made up of various components. One component is a planet carrier made up of two carrier flanges and the other component is a shaft with a radial flange. The planet carrier has two carrier flanges made of sheet metal, which are connected to one another axially by webs and planet pins. The planet carrier and the shaft are non-detachably materially bonded to one another. According to the embodiment shown in FIG. 1 of DE 11 2012 000 461 B4, one of the carrier flanges has a through-hole with an internal cylindrical guide surface. The inside diameter of the guide surface corresponds in nominal size to the outside diameter of an external cylindrical guide surface on the flange. The carrier flange is placed and supported on the flange in such a way that the internal cylindrical guide surface and the external cylindrical guide surface lie concentrically and radially on one another and the planet carrier is thus guided concentrically to the shaft. An annular shoulder of the carrier flange, the inner diameter of which is smaller than the outer diameter of the external cylindrical guide surface on the flange, axially adjoins the through-hole. This annular shoulder forms an axial stop. The axial stop ensures that the two joining surfaces are axially aligned with one another and are not axially offset from one another. The axial stop is also part of an axial fixing means in one axial direction. The other part of the axial fixing means is a weld seam, at which the planet carrier and the shaft are non-detachably connected to each other with a material bond. A combination of connection techniques using positive locking and welding is described using a planet carrier assembly published with DE 10 2012 223 226 A1. The planet carrier assembly is rotatably supported on a shaft by means of a hub. The connection between one of the carrier flanges of the planet carrier and the hub is made by a form-fit driver element toothing connection in the form of serrations. In addition, the carrier flange is axially secured to the hub by means of weld seams.

A generic connection between the carrier flange and the shaft of a planet carrier assembly is disclosed in DE 10 2007 003 676 A1. The connection is made in the classic way via the mutual form-fit of driver element teeth. The carrier flange is provided with form-fit elements on the inside, in which suitably outer form-fit elements of an intermediate piece engage. The intermediate piece is designed like a hub and has the outer driver elements on the outside and the inner driver elements on the inside. The internal driver elements are implemented as serrations and are provided for a shaft-hub connection between the planet carrier assembly and a shaft. This connection is supported by a parallel sliding or press fit with which the carrier flange sits on the hub. As an additional safeguard for this form-fit connection, a caulking of the form-fit connection is provided in DE 10 2007 003 676 A1, through which material is displaced from the hub and/or the carrier flange into the sliding fit and which blocks it in axial directions.

Also generally known are shaft-hub connections, e.g., from DE69424245T2, which are formed from a combination of a form-fit via serrations and axial securing by means of plastically displaced material.

SUMMARY

The present disclosure provides a planet carrier assembly in which a connection between the carrier and the carrier flange can be produced easily and inexpensively.

The disclosure provides that the carrier flange and the carrier aligned in the circumferential directions about the rotational axis at common contact areas in the circumferential directions interlock in a form-fit or optionally also mutually engage in an interlocking and force-locking manner, and are non-detachably connected to one another. According to the disclosure, the axial fixing means is integrated into the form-fit or interlocking and force-locking engagements. The driver elements, which engage in one another in a form-fit manner, are pressed against one another in the circumferential direction around the rotational axis or in the tangential direction to the rotational axis, and are also held together axially by undercuts lying in the axial directions.

The disclosure provides that both the production of the components of the planet carrier assembly and the connections of these components can be produced exclusively by cold forming such as stamping, embossing, and extrusion, and machining steps and welding can be avoided.

The present disclosure also provides a shaft-hub connection between a carrier flange and a carrier of a planet carrier assembly and a method for producing this shaft-hub connection.

The manufacturer's existing machines for manufacturing the components, such as stamping or pressing, can be used without needing to invest in cost-intensive welding systems. The carrier or the shaft is largely produced by cold extrusion, and the flank geometry of the radial projections is formed at the same time. The carrier flange, including the inner contour with the form-fitting elements, is optionally produced using individual methods or shaping methods combined in a specific sequence, for example by punching, drawing, and bending. The plug-in connection between the hub or shaft and the carrier flange is produced by means of embossing or rolling, or with other suitable plastic shaping processes. Alternatively, the spline toothings are extruded or, for example, stamped on the sheet metal hub. From this point of view, the only necessary investment costs are for the punching, bending, or extrusion tools. The energy consumption in producing the component connections is lower. Negative consequences of welding such as distortion or weld spatter are avoided. The preparation and post-processing of the connection points required for welding are no longer necessary.

Carriers are components that are suitable for receiving one or more carrier elements of the planet carrier of the planet carrier assembly. These are, for example, shafts, shaft ends, axles, bolts, housing parts, etc.

Carrier flanges are all components that have at least one bearing point for a journal of a planetary bearing or for a planetary bolt. The carrier flange may be a component made of steel, which is mainly produced by non-material-removing methods. An example embodiment of the carrier flange is a sheet metal part, which is optionally produced by methods such as stamping, bending, drawing, or embossing, or by combinations thereof.

Axial is always aligned with or parallel to the rotational axis, regardless of the orientation of the rotational axis in space. Accordingly, radial is directed to be transverse to the direction of the rotational axis and towards the rotational axis.

A non-detachable or undetachable connection can only be released again by destroying structures or material of the components connected to one another or axially secured to one another, such as the carrier and carrier flange.

Non-detachable connections within the meaning of the disclosure are form-fit/force-fit connections which, according to one embodiment, are formed by material which is plastically displaced from at least one of the driver elements. Known processes for the formation of plastic deformations are caulking, squeezing and embossing, possibly extrusion and rolling. The deformation may be produced by stamps acting in the axial direction. For example, material is plastically displaced from the end faces facing in the axial directions, on one side or on both sides, towards the flanks of the driver elements that lie against one another. These are pressed against one another in a force-fit manner and thereby wedged together and secured axially against one another by protruding plastically displaced material.

Material is the material or materials from which either the beam or the beam flange or both the beam and the beam flange are made, and which is monolithically formed with the beam or the beam flange.

First of all, the welded connection known from the prior art offers itself as a reliable connection between the flange and the beam flange. Due to the shape of the carrier flanges and the relatively large dimensions, the investment costs for the assembly and welding devices of such assemblies are relatively high. Laser welding is a common process in use. Welding has disadvantages due to the process. The energy consumption during production is high with the corresponding negative $CO_2$ emissions. The thermal energy introduced during welding can lead to warping due to the shape and dimensional accuracy of the components. Welding spatter occurs during welding, which can have a negative effect on the machining process or on the subsequent function of the planetary gear. As a rule, the components must be prepared for welding before they are manufactured, just as the welds must be reworked afterwards.

An embodiment provides that the first driver element and the second driver element lie against one another in the circumferential directions. A convex contour on one of the driver elements engages in a form-fit manner in a tangential direction or in the circumferential direction in a concave contour on the other driver element. The convex contour is axially engaged from the rear at two positions pointing away from each other axially by two axially opposite projections on the concave contour, each of which forms an axial fixing means in one of the axial directions. The projections are formed from plastically displaced material of the driver element from one of the driver elements or from both driver elements. Such flank-side contact is advantageous through the flanks of mutually engaging connections typical of shaft-hub connections via splines or serrations, in which the driver elements/teeth are aligned in the axial direction and the flanks are aligned in the circumferential direction or tangentially, and in which the teeth of the hub and the teeth of the shaft are mutually engaging.

Tangent is tangent to the circumferential direction about the rotational axis. The circumferential direction always runs on a circle or a circular area, the center of which is penetrated perpendicularly by the rotational axis.

A contour is an area or at least a contour line running between two points.

Concave and convex contours are defined in any parallel longitudinal sections through the driver element and through the form-fit engagement based on their position to an engagement path. The respective imaginary path of contact runs in the respective longitudinal section plane considered between points that lie on the respective contour line. The first point is on a first of the protrusions on the concave contour line and the second point is on the same contour line on the axially opposite second protrusion. Both projections protrude in the direction of the driver element with the convex contour and form undercuts which engage behind the convex contour at specific positions in the axial direction.

The concave contour is defined by the fact that its contour line is behind the imaginary engagement path. This means that the gap running in the considered longitudinal section plane between the concave contour line and the engagement path is not filled with the material of the driver element with the concave contour. In the same longitudinal section, the convex contour protrudes beyond the line of contact. That is, the gap formed in this longitudinal sectional plane between the convex contour line and the path of engagement is at least partially filled with the material of the driver element having the convex contour (see also the description of FIGS. 5 and 12).

The respective contour line runs in any spherically curved and/or straight line between the points, changing direction or linearly rising or falling, and can change direction as desired within the limits specified by the gap. In this case, straight means running in the axial direction or inclined in a straight line to the axial direction.

BRIEF DESCRIPTION OF THE DRAWINGS

In the following, the disclosure is explained in more detail with reference to an exemplary embodiment. The following depictions are not to scale. In the figures.

DETAILED DESCRIPTION

Figure 1:
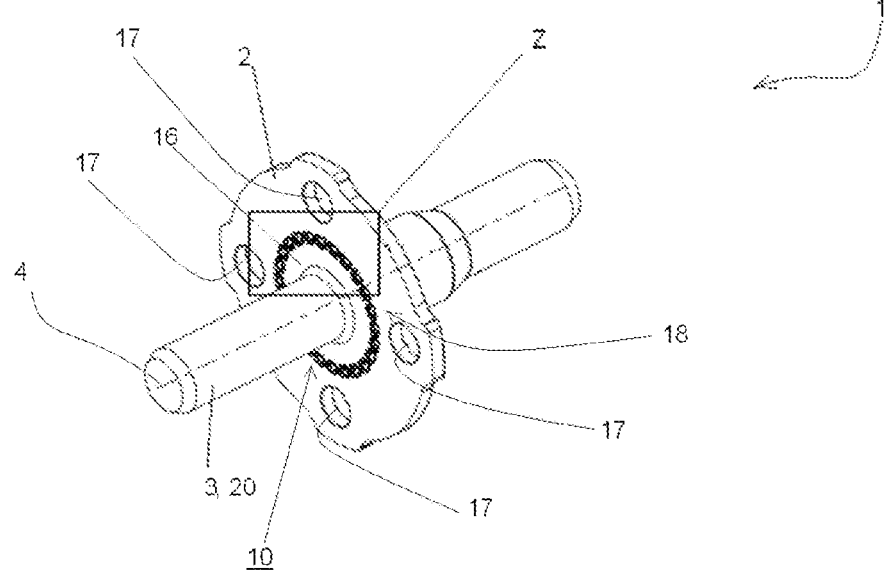
FIG. 1 shows a planet carrier assembly 1 formed from a carrier flange 2 and a carrier 3 in an overall view.
Figure 2:
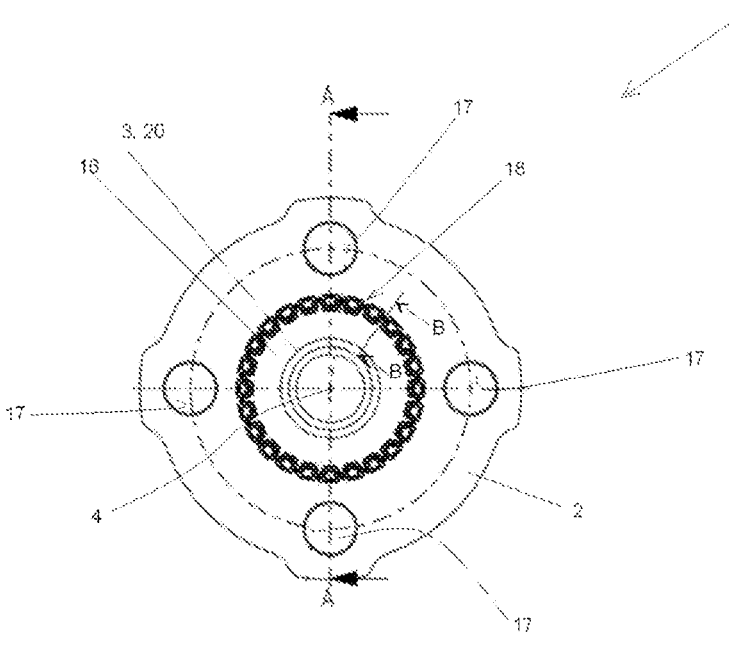
FIG. 2 shows the planet carrier assembly 1 of FIG. 1 in a front view.
Figure 3:
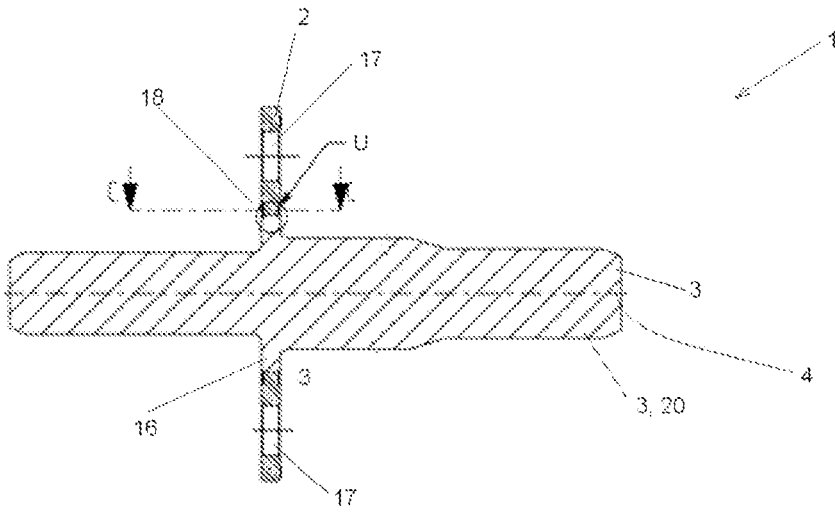
FIG. 3 shows the planet carrier assembly 1 of FIGS. 1 and 2 in a longitudinal section along the line A-A of FIG. 2.

FIGS. 1, 2, 3—The planet carrier assembly 1 is formed from a carrier 3 and a carrier flange 2. The carrier 3 is a shaft 20, for example a transmission shaft of an automatic transmission, not shown, of a motor vehicle, not shown, which is designed in one piece with a flange 16. The carrier flange 2 is a sheet metal plate on which receptacles 17 are perforated for planet bolts, not shown, of a planetary drive, not shown. The carrier flange 2 is arranged to be concentric to the rotational axis 4 on the carrier 3 or with a hub 18 on the flange 16 of the shaft 20.

Figure 6:
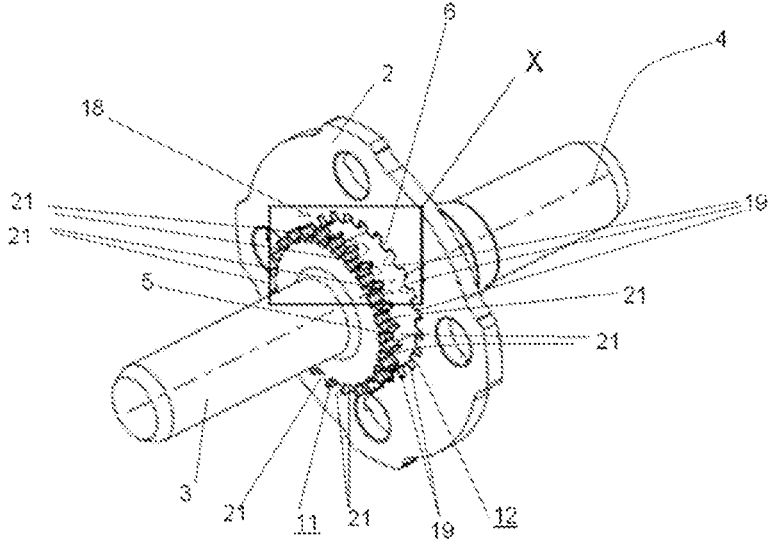
FIG. 6 shows the carrier 3 and the carrier flange 2 in a ready position of a method producing the planet carrier assembly 1 shown in FIG. 1.

FIGS. 1 and 6—On the inside, the carrier flange 2 is provided with an internally toothed through-hole (see FIG. 6), which is the basis of a hub 18 of a shaft-hub connection 10 between the carrier flange 2 and the shaft 20 shown in FIG. 1.

Figure 4:
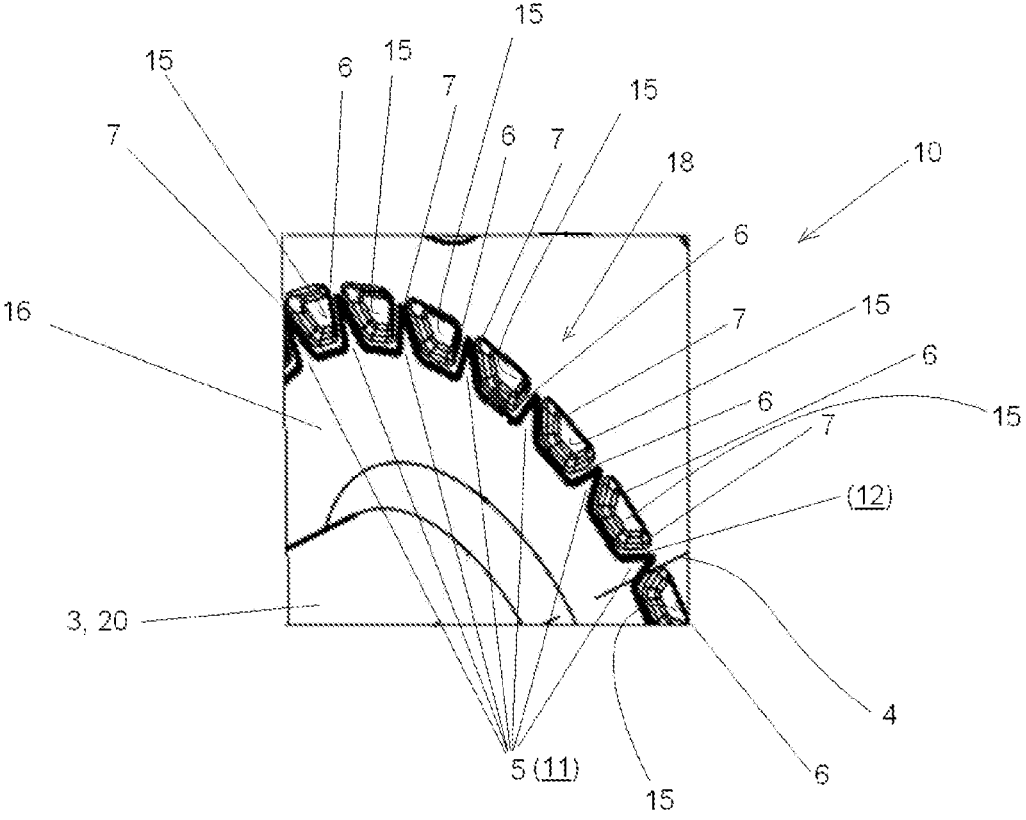
FIG. 4 shows a detail Z of the planet carrier assembly 1 marked in FIG. 1 in an enlarged representation that is not to scale.

FIG. 4—A detail of the shaft-hub connection 10 is shown. First driver elements 5 formed on the flange 16 of the carrier 3 and second driver elements 6 formed on the hub 18 of the carrier flange 2 are connected to one another in opposite circumferential directions about the rotational axis 4 in a form-fit or an interlocking and force-locking manner. The driver elements 5 are teeth of a driver element shaft profile 11 designed as a spline or serration. The teeth are distributed in the circumferential direction around the rotational axis 4 on the circumference of the flange 16, and each protrude radially out of the flange 16 into one of the tooth spaces of the driving hub profile 12. The driver element hub profile 12 is formed on the hub 18 and is formed from the second driver elements 6, which each engage in a form-fit manner radially in the direction of the shaft 20 at a form-fit engagement 7 and engage in a form-fit manner in a tooth gap formed between the first driver elements 5 and completely fill this tooth gap.

Figure 7:
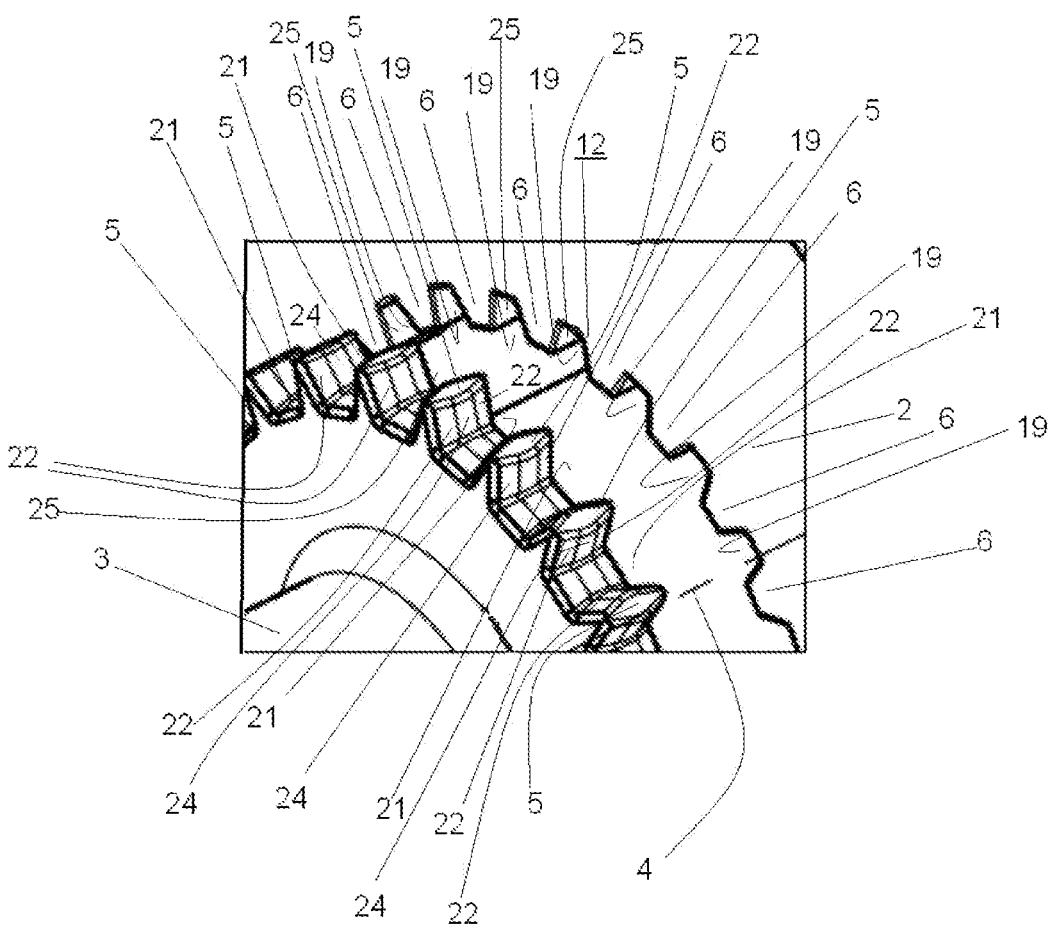
FIG. 7 shows a detail X marked in FIG. 6 in an enlarged representation that is not to scale.

FIGS. 6 and 7—The driver element shaft profile 11 consists of a number of first driver elements 5 distributed around the rotational axis 4, which are each separated from one another by tooth gaps 21. The carrier hub profile 12 is formed by a number of second driver elements 6 distributed around the rotational axis 4, which are separated from one another in the circumferential direction by a tooth gap 19 in each case. Before assembly, the carrier 3 and the carrier flange 2 are aligned with one another on the rotational axis 4 such that a first driver element 5 is axially opposite a tooth gap 19 of the driver element hub profile 12 and a second driver element 6 is axially opposite a tooth gap 21 of the driver element shaft profile 11.

FIG. 7—The flanks 24 of the first driver element 5 have a convex profile, which is arched out of the driver element 5 into the respective tooth gap 21. There are two flanks 24 of adjacent first driver elements tangentially or in the circumferential direction opposite each other at the respective tooth gap 21. The flanks 25 of the second driver element 6 face each other at the respective tooth gaps 19 as parallel and mutually inclined surfaces.

Figure 8:
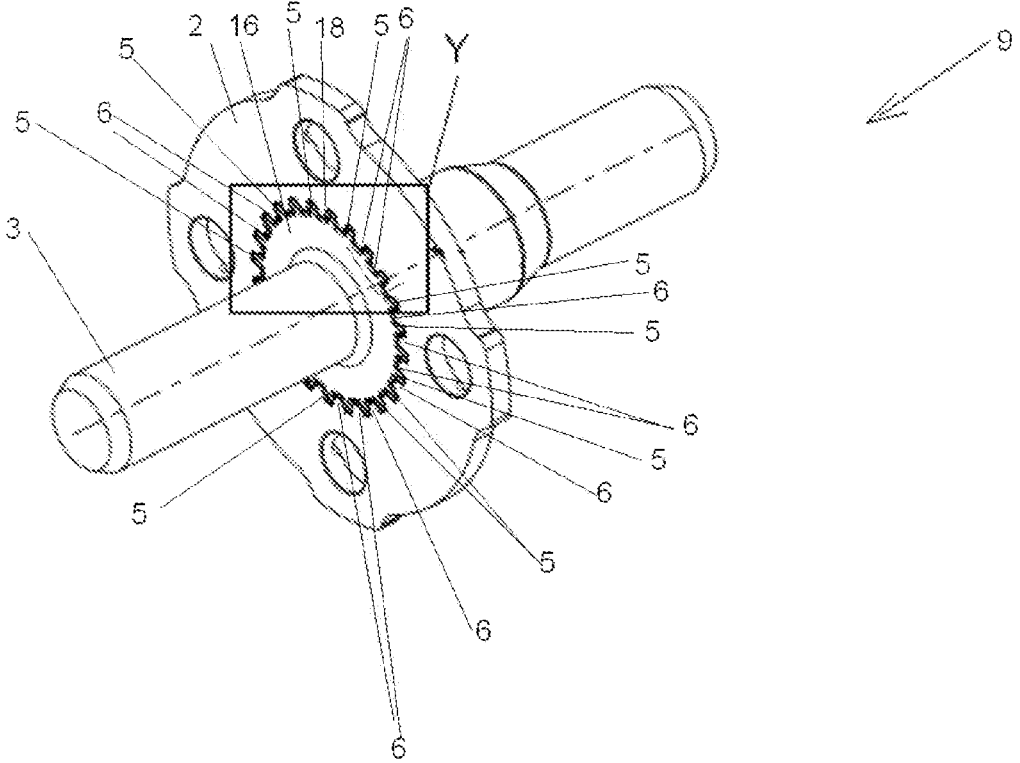
FIG. 8 shows a pre-assembly assembly 9 for producing the shaft-hub connection 10 shown in FIG. 5 in the planet carrier assembly 1 shown in FIGS. 1-3, shown in an overall view.
Figure 9:
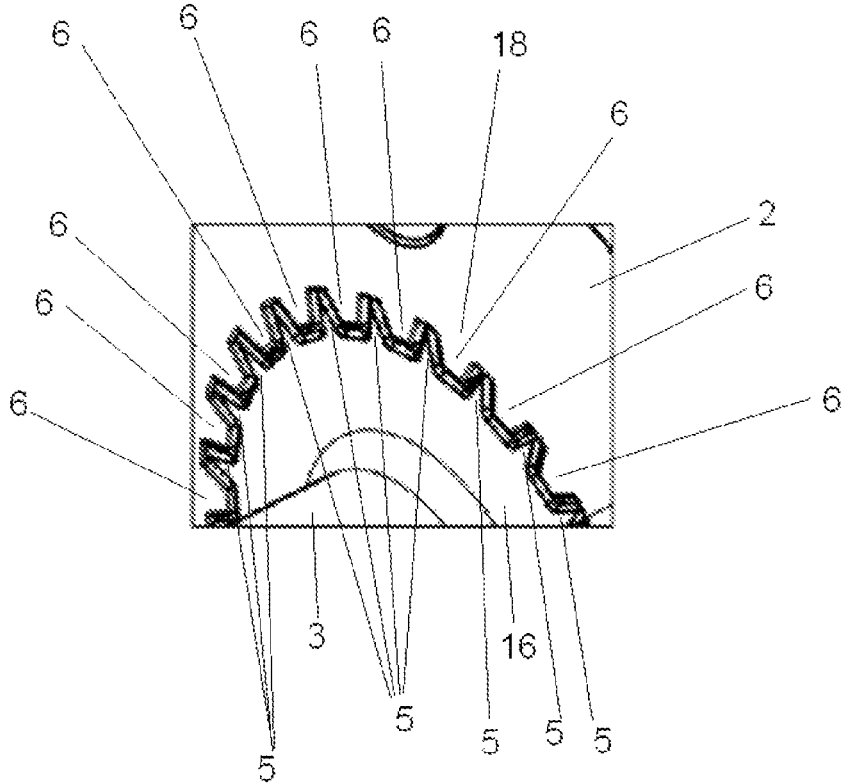
FIG. 9 shows a detail Y marked in FIG. 8 in an enlarged representation that is not to scale.
Figure 10:
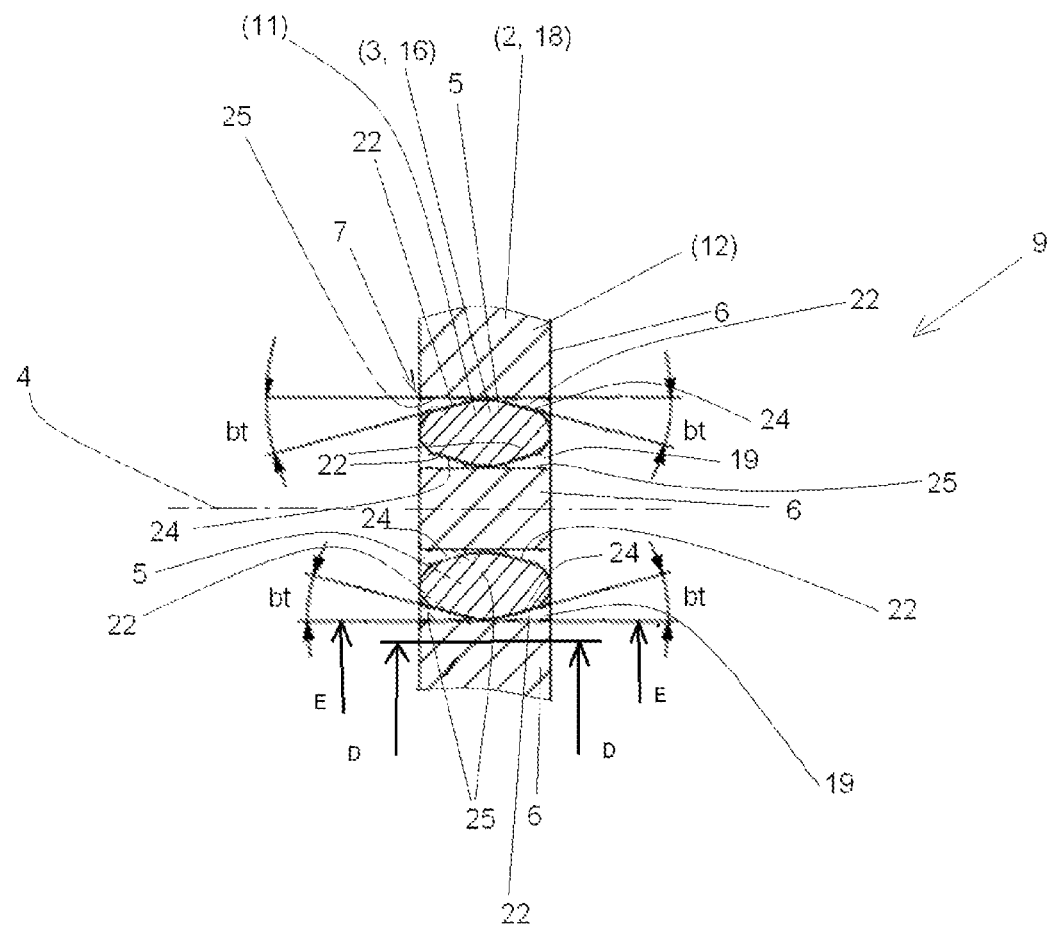
FIG. 10 shows a detail of the pre-assembly assembly 9 shown in FIG. 8 in a sectional plane running transversely and parallel to the rotational axis 4, which runs at a distance from the rotational axis 4 approximately at the position of the section line C-C shown in FIG. 3.

FIGS. 8, 9, and 10—In a further method step, the carrier 3 and the carrier flange 2 are pushed axially into one another. The carrier flange 2 with the hub 18 is slid onto the flange 16 in such a way that the first driver element 5 and the second driver element 6 form a form fit due to the mutual engagement.

FIG. 10—Via the form fit, torques can be transmitted in the circumferential direction about the rotational axis 4 between the carrier 3 and the carrier flange 2 via the flanks 24 of the first driver element 6 rest against the flanks 25 of the second driver element 6 in the circumferential direction. For this, the first driver elements engage in tooth gaps 19 which are formed between the second driver elements 6. When the driver element shaft profile 11 and the driver element hub profile 12 are plugged into one another axially and in the circumferential direction in a form-fit manner according to one method step, the respective second driver element 6 is aligned in a tooth gap 21 in such a way that each convex flank 24 of the respective first driver element 5 corresponds to an axially aligned flank 25 parallel to one of the second driver elements 6 in the circumferential direction about the rotational axis 4 or tangentially opposite thereto.

FIGS. 7 and 10—The flanks of the teeth or the first driver element 5 are provided with bevels 22, which are inclined towards the axially facing end faces of the teeth at the angle bt (cf. FIG. 10) and slope downward. The bevels 22 of adjacent driver elements 5 face each other in the tangential direction, are flat in this case but can also be spherical, and determine the contour of the convex profile. The flanks 25 of the second driver element 6 are flat and run axially and parallel to one another at each of the tooth gaps 19, and are radially inclined with respect to one another.

Figure 11:
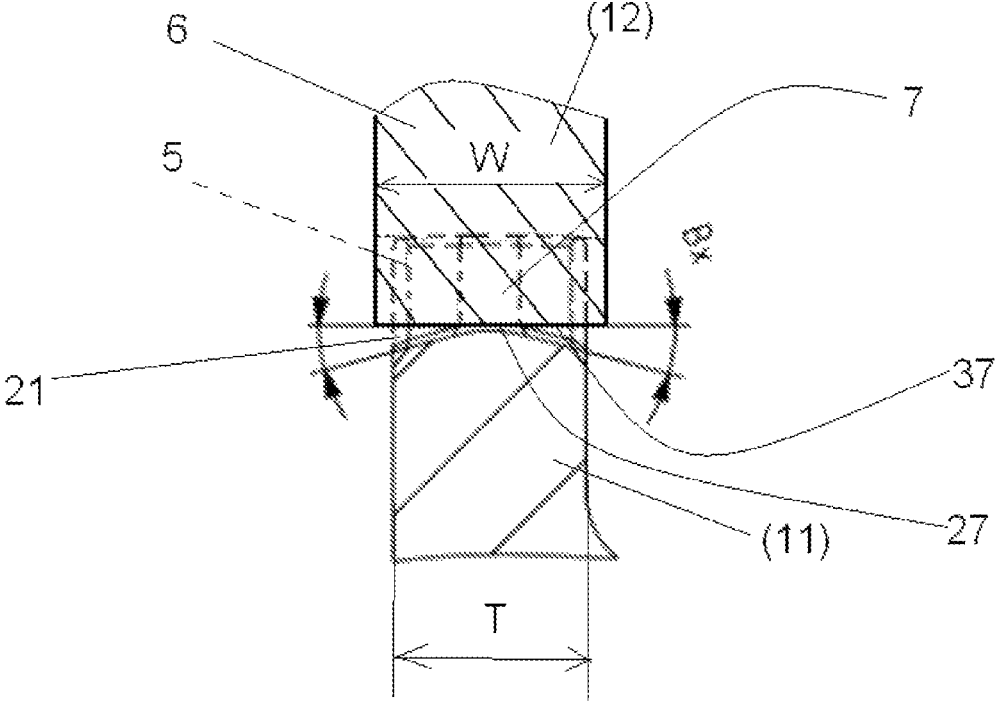
FIG. 11 shows an alternative detail from the pre-assembly assembly 9 shown in FIG. 8 in a longitudinal, axial sectional plane along the sectional line D-D marked in FIG. 10.
Figure 11A:
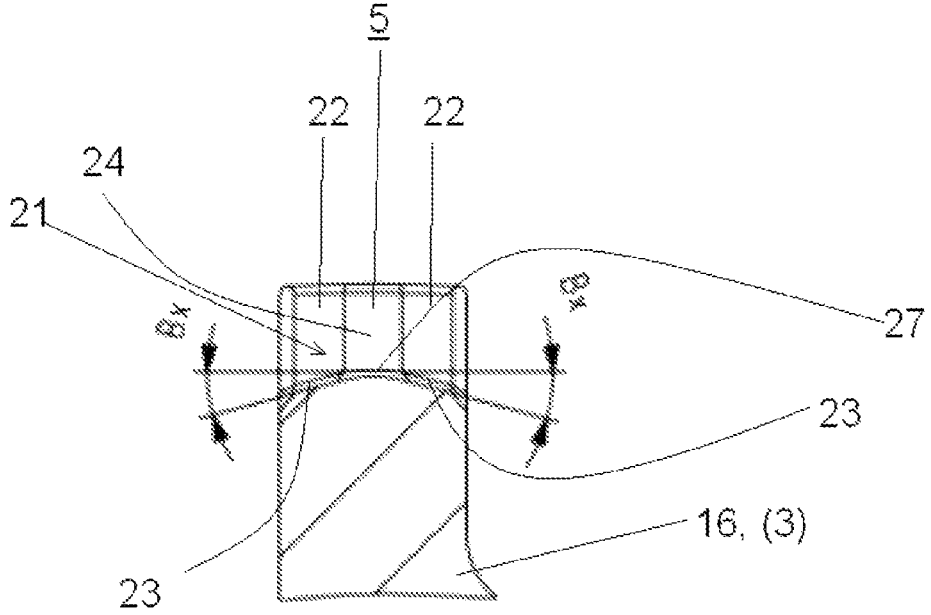
FIG. 11a shows a detail of the flange 16 of the carrier 3 and cut along the cutting line E-E marked in FIG. 10.

FIG. 11a—In the section running in a radial plane through a tooth gap 21, the view falls on a flank 24 of a first driver element 5 having the bevels 22. The base 27 of the tooth gaps 21, where the driver element merges into the flange 16, drops down at the bevels 23 inclined with the angles Bx towards the axial end sides of the flange 16, so that in each tooth gap 21 a profile of the tooth gap 21 protruding radially outwards into the tooth gap 21 is formed at the base 27.

FIG. 11—The figure shows a longitudinal section of a second driver element 6 engaging in the tooth gap 21. The broken lines indicate a first driver element 5. Deviating from previous illustrations, the carrier flange 2 with the width W is shown wider than the flange 16 with the width T on the form-fit contact areas 7. The following ratios of dimensions W and T are possible: T≥W (not shown) or W≥T. Possibly, material accumulations are created by the width differences, which provide sufficient material which is plastically displaced to form the axial fixing means. When the driver element shaft profile 11 and the driver element hub profile 12 are inserted axially into one another in a method step, and thus engage in a form-fit manner in one another in the circumferential direction, the respective second driver element 6 is aligned in a tooth gap 21 in such a way that the, for example, flat or straight contour 37 on the head of the respective second driver element 6 is radially opposite the convex profile at the base 27 of the tooth gap 21.

FIGS. 1, 2, 3, 4, 5, and 12—In the pre-assembly assembly described with FIGS. 8, 9, 10, and 11, torques can already be transmitted in the circumferential direction around the rotational axis via the form-fit engagement of the driver element teeth. However, this pre-assembly assembly lacks the axial securing of the carrier and carrier flange against one another or against one another. On the other hand, FIGS. 1, 2, 3, 4, 5, and 12 describe the finished planet carrier assembly 1, in which form-fit or interlocking and force-locking connections between the driver element profiles are formed according to the disclosure. The interlocking and force-locking connections unfold their effect both in the axial direction as an axial fixing means and as an additional effect the tangential or circumferential clearance of the connection.

FIGS. 4 and 8 or 9—Starting from the pre-assembly 9 shown in FIG. 8 or 9, in the next step in the process, e.g., by embossing (not shown) from the driver elements 6 of hub 18, material is plastically displaced in such a way that the depressions 15 shown in FIG. 4 are created. One of the depressions 15 extends axially into one of the second driver elements 6 in each case.

Figure 5:
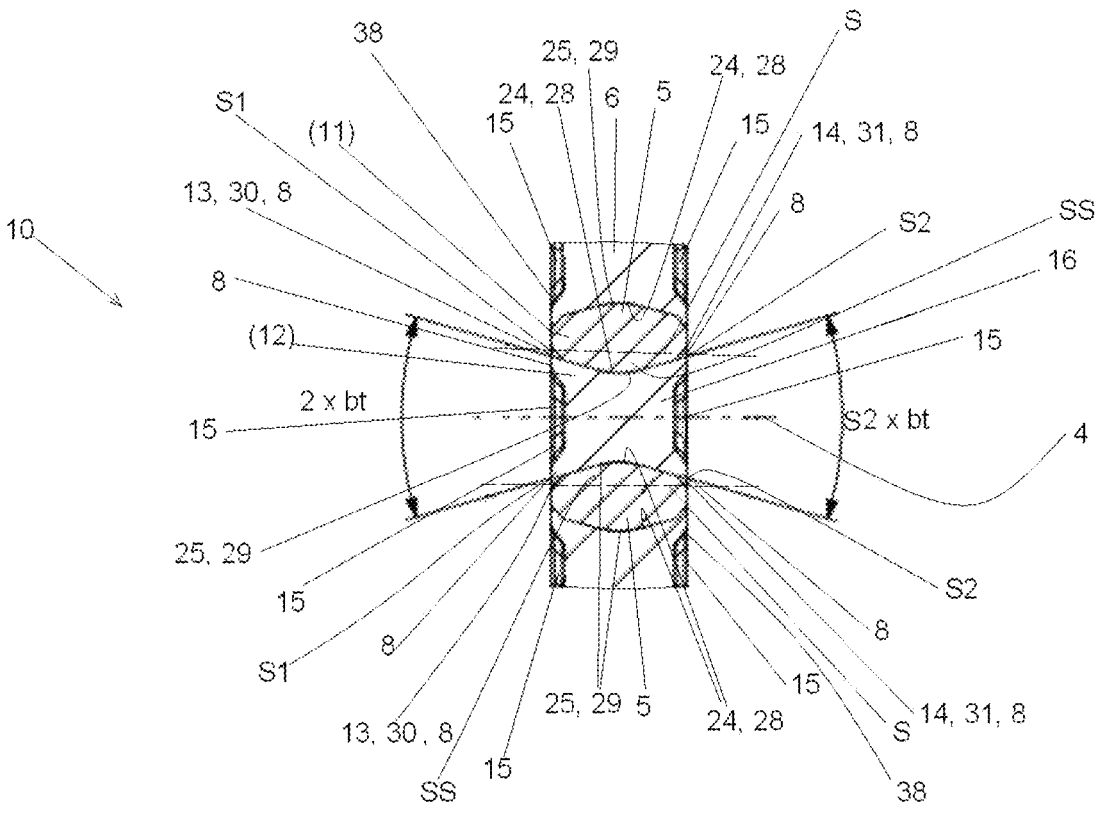
FIG. 5 shows a detail of a shaft-hub connection 10 of the planet carrier assembly 1 in a sectional plane running transversely and parallel to the rotational axis 4 at the level of the sectional line C-C marked in FIG. 3, in an enlarged representation that is not to scale.

FIGS. 10 and 5—While FIG. 10 shows the form-fit engagement 7 of the driver element shaft profile 11 in the driver element shaft profile 12 on the pre-assembly assembly, FIG. 5 shows both the form-fit and the force-fit engagement in a non-detachable connection including an axial fixing means 8 of both driver element profiles 11 and 12 after embossing the depressions 15.

Figure 12:
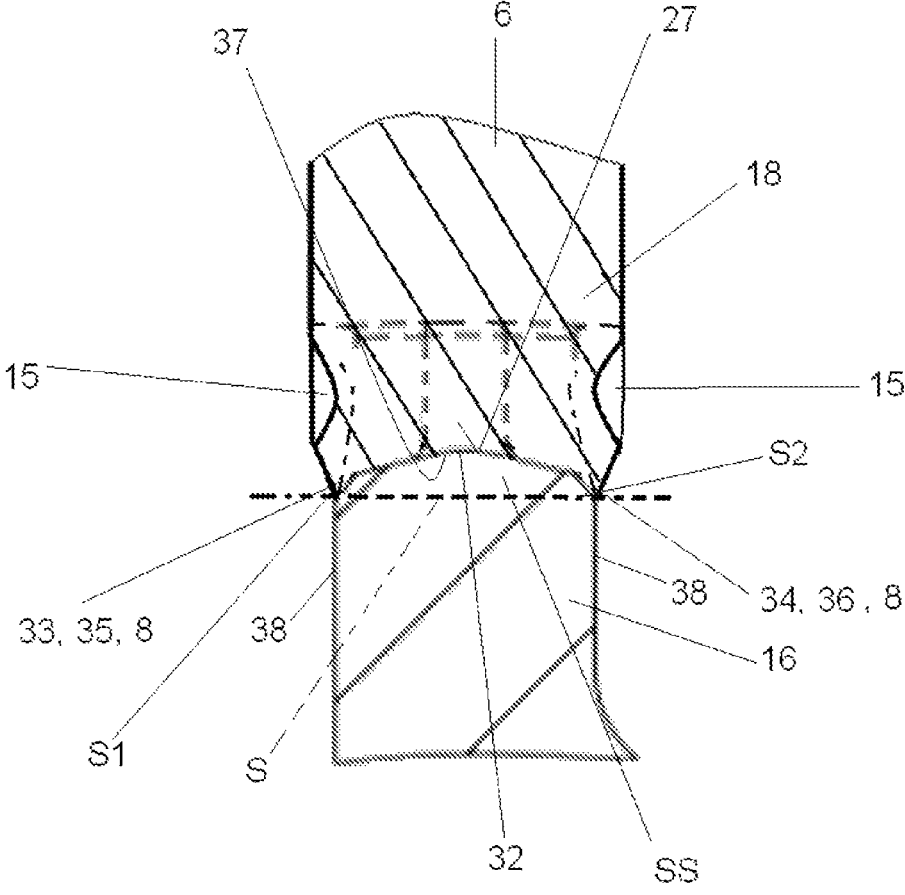
FIG. 12 shows a detail of the planet carrier assembly 1 along the section line B-B marked in FIG. 2 or alternatively according to the detail U from FIG. 3.

FIGS. 11 and 12—FIG. 11 also shows the form-fit engagement of the two driver element profiles 11 and 12 before embossing. FIG. 12, on the other hand, shows an interlocking and force-locking connection between the flange 16 and the hub 18, which was produced by the plastic displacement of material, for example steel of the second driver element 6, to create the depressions 15.

FIGS. 5 and 12—As shown in an example in each case, a first driver element 5 and a second driver element 6 rest against one another in the circumferential directions. During the embossing of the depressions 15, these were pressed against one another in the circumferential direction or tangentially in such a way that they are clamped against one another in a force-fit and form-fit manner.

FIG. 5—The embossing of the depressions 15 caused material from the second driver elements 6 to be plastically displaced and pressed against the convex flanks 24 of the first driver elements. This material nestles against the convex contour 28, as a result of which the concave contour 29 on the flanks 25 of the second driver element 6 was formed. This means that a convex contour 28 on the driver element 5 in a tangential direction to the rotational axis 4, or in a circumferential direction around the rotational axis 4, engages in a form-fit manner in a concave contour 29 in a form-fit manner on the other driver element 6. When the depressions 15 were embossed, material was also displaced into the areas in positions 30 and 31 that were furthest away from the respective driver element 6. As a result, the convex contour 28 is axially engaged behind by two projections 13 and 14 at these two positions 30 and 31 pointing away from one another axially. The projections 13 and 14 protrude from the second driver element 6 at the ends of the concave contour 29 and are axially opposite one another. These projections 13 and 14 are formed by two sections of the plastically displaced material which protrude from the second driver element 6 and protrude furthest in the direction of the respective first driver element 5. Such a form fit means that the axial fixing means 8 is formed by material that is plastically displaced from the second driver elements 6 and which forms axial stops at positions 30 and 31. The flanks 25 shown in this exemplary embodiment are shown in an idealized manner after embossing and are inclined towards one another at an angle 2×Bt, which corresponds to twice the angle bt (FIG. 10), i.e., the concave contour of the flanks 25 is adapted to the angle bt of the flanks 24 (see FIG. 10). Alternatively, the flanks 25 are also plastically deformed in all conceivable contours after the embossing (not shown).

FIG. 12—The embossing of the depressions 15 caused material from the second driver elements 6 to be plastically displaced and pressed against the convex contour 32 which is formed on the base 27 of the tooth gap 19. This material nestles against the convex contour 32, as a result of which the concave contour 37 at the head of the second driver element 6 was formed. This means that for each tooth gap 21, a convex contour 32 on the flange 16 engages in a form-fit manner in a concave contour 37 on the head of the respective second driver element 6 in the radial direction away from the rotational axis 4, not shown in FIG. 12. The rotational axis lies outside and below the viewed image plane. During the embossing of the recesses 15, material was also displaced into the areas furthest behind the respective carrier 6 in the direction of the axis of rotation 4 in positions 33 and 34 so that the convex contour 32 at these two axially distancing positions 33 and 34 is axially engaged by two protrusions 35 and 36 axially opposite each other at the concave contour 37. These projections 35 and 36 are formed by two sections of the plastically displaced material which protrude furthest in the direction of the flange 16. Such a form fit means that the axial fixing means 8 is formed by plastically displaced material from the end faces of the second driver element, which material is designed as axial stops at positions 33 and 34.

FIGS. 5 and 12—The respective concave contour 37, 29 is defined in that its contour line is behind the imaginary engagement path S. The engagement path S lies in the illustration on the straight line shown in dashed lines, and extends between the points of intersection S1 and S2. At the intersection points S1 and S2, the respective contour line of the respective concave contour 37 alternatively convex contour 32 intersects the contour line of the end face 38. That is, the gap SS running in the considered longitudinal section plane between the concave contour 37 or 29 and the engagement path S is not filled by the material of the second driver element 6 with the concave contour 37 or 29, but by a section of the first driver element 5 or of the flange 16. In the same longitudinal section, the convex contour 28 or 32 protrudes beyond the engagement path S. In other words, the gap SS formed in this longitudinal section plane between the convex contour line 28 or 32 and the engagement path S is at least partially filled with the material of the first driver element 5 or the flange 16.

In the exemplary embodiment described above, it was exclusively assumed that the axial fixing means 8 is formed exclusively from material plastically displaced from the second driver elements 6. Alternatively, the axial fixing means can be formed both from plastically displaced material of the first driver element and from plastically displaced material of the second driver element or only from plastically displaced material from the first driver element (not shown).

REFERENCE NUMERALS

1 Planet carrier assembly
2 Carrier flange
3 Carrier
4 Rotational axis
5 Driver element of the carrier
6 Driver element of the carrier flange
7 Form-fit engagement
8 Axial fixing means
9 Pre-assembly assembly
10 Shaft-hub connection
11 Driver element shaft profile
12 Driver element hub profile
13 Projection
14 Projection
15 Depression
16 Flange
17 Receptacle
18 Hub
19 Tooth gap of the driver element hub profile
20 Shaft
21 Tooth gap of the driver element shaft profile
22 Bevel
23 Bevel
24 Flank of the first driver element
25 Flank of the second driver element
26 Contour on the head of the second driver element
27 Base for the tooth gap
28 Convex contour of the first driver elements
29 Concave contour of the second driver elements
30 Location/Region
31 Location/Region
32 Convex contour at the base of the tooth gap
33 Location/Region
34 Location/Region
35 Projection
36 Projection
37 Concave contour on the head of the second driver element
38 End face

The invention claimed is:

1. A planet carrier assembly comprising:
a rotational axis;
a carrier comprising circumferentially spaced first driver elements formed thereon; and
a carrier flange comprising circumferentially spaced second driver elements formed thereon, the second driver elements being interconnected with the first driver elements at common contact areas in an interlocking manner, the carrier flange being non-detachably connected to and axially secured to the carrier in both axial directions at the common contact areas with material which is plastically displaced by embossing, creating a depression into at least one of the driver elements.

2. The planet carrier assembly of claim 1, wherein:
the first driver elements and the second driver elements rest against one another in a circumferential direction around the rotational axis; and
a convex contour on one of the first driver elements or the second driver elements engages in an interlocking manner in a concave contour on the other of the first driver elements or the second driver elements in a tangential direction to the rotational axis or in the circumferential direction.

3. The planet carrier assembly of claim 2, wherein the convex contour is axially interlocked at two axially distancing positions by two projections axially opposite each other on the concave contour.

4. The planet carrier assembly of claim 3, wherein:
the two projections are formed by the material; and
the material is displaced from the first driver elements or the second driver elements.

5. The planet carrier assembly of claim 1, wherein:
each one of the first driver elements is arranged circumferentially between two of the second driver elements;
each one of the second driver elements is arranged circumferentially between two of the first driver elements; and
successive driver elements of the first driver elements and the second driver elements are in interlocking or force-locking contact with one another.

6. A planet carrier assembly having at least one carrier flange and a carrier, wherein the carrier flange is arranged to be concentric to a rotational axis of the planet carrier assembly, wherein first driver elements of the carrier formed on the carrier and second driver elements of the carrier flange formed on the carrier flange in opposite circumferential directions around the rotational axis are interconnected in an interlocking manner, wherein the carrier flange and the carrier are axially secured to one another in the same direction as the rotational axis, wherein the carrier flange and the carrier engage in one another in an interlocking manner in the circumferential directions around the rotational axis at common contact areas in the circumferential directions, and are non-detachably interconnected, and wherein the common contact areas axially secure the carrier flange and the carrier with material which is plastically displaced by embossing, creating a depression into at least one of the driver elements.

7. The planet carrier assembly according to claim 6, wherein the first driver elements and the second driver elements rest against one another in the circumferential directions, and wherein a convex contour on one of the driver elements engages in an interlocking manner in a concave contour on the other driver element in the tangential direction to the rotational axis or in the circumferential direction around the rotational axis.

8. The planet carrier assembly according to claim 6, wherein a convex contour is axially interlocked at two axially distancing positions by two projections axially opposite each other on a concave contour, and wherein the convex contour is formed on the carrier or on the carrier flange.

9. The planet carrier assembly according to claim 8, wherein the projections are formed by material of the driver element plastically displaced from at least one of the driver elements.

10. The planet carrier assembly according to claim 6, wherein, in the circumferential direction around the rotational axis, one of the first driver elements is successively arranged between two second driver elements and each second driver element between two first driver elements, and wherein the driver elements are in interlocking or force-locking contact with one another.

* * * * *